US011458896B2

United States Patent
Kenmochi et al.

(10) Patent No.: US 11,458,896 B2
(45) Date of Patent: Oct. 4, 2022

(54) VEHICLE DOOR MIRROR

(71) Applicants: KABUSHIKI KAISHA HONDA LOCK, Miyazaki (JP); HONDA MOTOR CO., LTD., Tokyo (JP)

(72) Inventors: Kenji Kenmochi, Miyazaki (JP); Yukinori Kawano, Miyazaki (JP); Yuki Ishibashi, Miyazaki (JP); Takeshi Sasaki, Wako (JP); Takuro Hashimoto, Wako (JP)

(73) Assignees: Kabushiki Kaisha Honda Lock, Miyazaki (JP); Honda Motor Co., Ltd., Tokyo (JP)

( * ) Notice: Subject to any disclaimer, the term of this patent is extended or adjusted under 35 U.S.C. 154(b) by 61 days.

(21) Appl. No.: 16/852,896

(22) Filed: Apr. 20, 2020

(65) Prior Publication Data

US 2020/0339036 A1    Oct. 29, 2020

(30) Foreign Application Priority Data

Apr. 23, 2019  (JP) .............................. JP2019-081603

(51) Int. Cl.
B60R 1/074    (2006.01)
(52) U.S. Cl.
CPC .................... B60R 1/074 (2013.01)
(58) Field of Classification Search
CPC .. B60R 1/074; B60R 1/07; B60R 1/06; B60R 1/02; B60R 1/025
(Continued)

(56) References Cited

U.S. PATENT DOCUMENTS 6,793,358 B2    9/2004  Sakata
7,104,660 B2 *  9/2006  Sakata .................... B60R 1/074
                                             359/841
(Continued)

FOREIGN PATENT DOCUMENTS

JP          06-068993 U    9/1994
JP          H07-223489 A   8/1995
(Continued)

OTHER PUBLICATIONS

Official Communication dated Nov. 18, 2020 issued over the corresponding Japanese Patent Application No. 2019-081603.

*Primary Examiner* — Eret C McNichols
*Assistant Examiner* — Michael McDuffie
(74) *Attorney, Agent, or Firm* — Carrier Blackman & Associates, P.C.; William D. Blackman; Joseph P. Carrier (57)  ABSTRACT

In a vehicle door mirror, an electric retraction unit is disposed between a mirror housing and a shaft pivotably supporting a base end part of the mirror housing, and at least three housing fastening parts are fastened to the mirror housing and provided integrally with a unit constituent member forming part of the electric retraction unit. A vibration suppression arm part is provided integrally with the unit constituent member and extends in a direction that goes away from at least two of the at least three housing fastening parts. A remaining one housing fastening part of the at least three housing fastening parts is formed in a tip end part of the vibration suppression arm part. Accordingly, the vehicle door mirror can give an effective vibration suppression effect while enhancing the workability and suppressing any increase in the cost.

10 Claims, 7 Drawing Sheets

(58) Field of Classification Search
USPC .... 248/636, 548, 549, 466, 475.1, 476, 479, 248/478
See application file for complete search history.

(56) References Cited

U.S. PATENT DOCUMENTS

| | | | |
|---|---|---|---|
| 8,708,505 B2 | 4/2014 | Iseki | |
| 8,894,223 B2 | 11/2014 | Iseki | |
| 2002/0085295 A1* | 7/2002 | Ohashi | B60R 1/06 359/872 |
| 2004/0129853 A1* | 7/2004 | Suzuki | B60R 1/1207 248/475.1 |
| 2006/0087754 A1* | 4/2006 | Blakeman | B60R 1/06 359/872 |
| 2006/0262432 A1* | 11/2006 | Sakamoto | B60R 1/025 359/841 |
| 2008/0149803 A1* | 6/2008 | Yoshida | B60R 1/074 248/479 |
| 2008/0297927 A1* | 12/2008 | Onuki | B60R 1/074 359/841 |
| 2012/0119053 A1* | 5/2012 | Sugisaka | B60R 1/06 248/479 |
| 2013/0062496 A1* | 3/2013 | Niessen | B60R 1/006 248/475.1 |
| 2014/0124643 A1* | 5/2014 | Hamada | B60R 1/0617 248/479 |
| 2014/0139938 A1* | 5/2014 | Freytag | B60R 1/0607 359/844 |
| 2015/0266423 A1* | 9/2015 | Tada | B60R 1/006 248/475.1 |
| 2015/0274076 A1* | 10/2015 | Eto | F16M 13/022 248/479 |
| 2015/0353016 A1* | 12/2015 | de Swardt | B60R 1/06 29/453 |
| 2016/0016516 A1* | 1/2016 | Lang | B60R 1/00 248/476 |
| 2016/0082878 A1* | 3/2016 | Steinhilb | B60Q 1/0408 296/187.09 |
| 2016/0102702 A1* | 4/2016 | Lang | B60R 1/00 248/479 |
| 2016/0176354 A1* | 6/2016 | Ando | B60K 1/04 248/548 |
| 2017/0232901 A1* | 8/2017 | Schadler | B60R 1/076 359/841 |
| 2017/0253184 A1* | 9/2017 | Nishimoto | B60R 1/06 |
| 2019/0009723 A1* | 1/2019 | Tomiyama | B60R 1/072 |

FOREIGN PATENT DOCUMENTS

| | | |
|---|---|---|
| JP | H08-002324 A | 1/1996 |
| JP | 2002-274266 A | 9/2002 |
| JP | 2004-009806 A | 1/2004 |
| JP | 2006-306321 A | 11/2006 |
| JP | 2011-121493 A | 6/2011 |
| JP | 2011-121495 A | 6/2011 |
| JP | 4924482 B2 | 4/2012 |
| JP | 2013-001179 A | 1/2013 |
| JP | 2015-229487 A | 12/2015 |

* cited by examiner

FIG.6

VEHICLE DOOR MIRROR

BACKGROUND OF THE INVENTION

Field of the Invention

The present invention relates to a vehicle door mirror comprising a mirror housing that has a mirror housing recess housing a mirror, a base member that is to be mounted on a side door, a shaft that is standingly provided on the base member so as to pivotably support a base end part of the mirror housing, and an electric retraction unit that is disposed between the shaft and the mirror housing so as to pivot the mirror housing around an axis of the shaft, at least three housing fastening parts being fastened to the mirror housing and provided integrally with a unit constituent member forming part of the electric retraction unit.

Description of the Related Art

Such a vehicle door mirror is known from for example Japanese Patent No. 4924482, and in this arrangement in order to prevent visibility from being degraded due to chattering in the mirror caused by small vibrations of a mirror housing due to the vehicle traveling, a reinforcing plate is mounted on an inner face of the mirror housing.

However, in the structure disclosed in Japanese Patent No. 4924482, the reinforcing plate, which is a separate member from an electric retraction unit, is mounted on the mirror housing, it is therefore necessary to carry out an operation of mounting the reinforcing plate on the mirror housing in addition to an operation of mounting the electric retraction unit thereon, and not only is the workability degraded, but also the production cost is increased. Moreover, since some of the plurality of locations via which the reinforcing plate is fastened to the mirror housing are fastened to the mirror housing by being fastened together with the electric retraction unit, if the fastening part via which it is fastened together therewith becomes loose, there is a possibility that the vibration suppression force will be decreased.

SUMMARY OF THE INVENTION

The present invention has been accomplished in light of such circumstances, and it is an object thereof to provide a vehicle door mirror that can give an effective vibration suppression effect while enhancing the workability and suppressing any increase in the cost.

In order to achieve the object, according to a first aspect of the present invention, there is provided a vehicle door mirror comprising a mirror housing that has a mirror housing recess housing a mirror, a base member that is to be mounted on a side door, a shaft that is standingly provided on the base member so as to pivotably support a base end part of the mirror housing, and an electric retraction unit that is disposed between the shaft and the mirror housing so as to pivot the mirror housing around an axis of the shaft, at least three housing fastening parts being fastened to the mirror housing and provided integrally with a unit constituent member forming part of the electric retraction unit, wherein a vibration suppression arm part is provided integrally with the unit constituent member, the vibration suppression arm part extending in a direction that goes away from at least two of the at least three housing fastening parts, and a remaining one housing fastening part of the at least three housing fastening parts is formed in a tip end part of the vibration suppression arm part.

In accordance with the first aspect of the present invention, since the vibration suppression arm part is provided integrally with the unit constituent member and the housing fastening part is formed on the tip end part of the vibration suppression arm part, an operation of fastening a member, used exclusively for suppressing vibration, to the mirror housing other than the electric retraction unit is unnecessary, and it is possible to enhance the ease of mounting and reduce the cost while suppressing any increase in the number of components. Moreover, the vibration suppression arm part extends in a direction going away from at least two housing fastening parts, and it is possible to attenuate the vibration transmitted from the side door side to the mirror housing side via the electric retraction unit, and to suppress effectively small vibrations of the mirror housing.

According to a second aspect of the present invention, in addition to the first aspect, the vibration suppression arm part is formed so as to have a bent portion in an intermediate part thereof.

In accordance with the second aspect of the present invention, since the vibration suppression arm part has the bent portion in the intermediate part thereof, the route of transmission of vibration from the electric retraction unit to the mirror housing can be made longer, and it is possible to attenuate the vibration transmitted to the mirror housing side and to suppress effectively small vibrations of the mirror housing.

According to a third aspect of the present invention, in addition to the second aspect, a mirror angle adjustment unit that can make the mirror tilt is fixed within the mirror housing, and the bent portion is formed so as to bend toward a side on which overlapping the mirror angle adjustment unit is avoided when viewed from a vehicle fore-and-aft direction in a state in which the mirror housing is present at a raised position in which the mirror housing is to protrude sideways from the side door.

In accordance with the third aspect of the present invention, since the bent portion bends toward the side on which overlapping the mirror angle adjustment unit is avoided, it is possible to easily carry out mounting of the mirror angle adjustment unit on the mirror housing and removal therefrom without interference from the vibration suppression arm part.

According to a fourth aspect of the present invention, in addition to any one of the first to third aspects, a base part of the vibration suppression arm part is integrally and connectedly provided on the unit constituent member in a vicinity of a specific housing fastening part of the at least three housing fastening parts other than the housing fastening part that is formed in the tip end part of the vibration suppression arm part, and the specific housing fastening part is fastened to the mirror housing by means of a pair of upper and lower screw members.

In accordance with the fourth aspect of the present invention, since the base part of the vibration suppression arm part is integrally and connectedly provided on the unit constituent member in the vicinity of the specific housing fastening part, and the specific housing fastening part is fastened to the mirror housing by means of a pair of upper and lower screw members, it is possible to enhance the strength of the vicinity of the part of the vibration suppression arm part connected to the unit constituent member.

The above and other objects, characteristics and advantages of the present invention will be clear from detailed descriptions of the preferred embodiment which will be provided below while referring to the attached drawings.

DESCRIPTION OF THE PREFERRED EMBODIMENT

Figure 1:
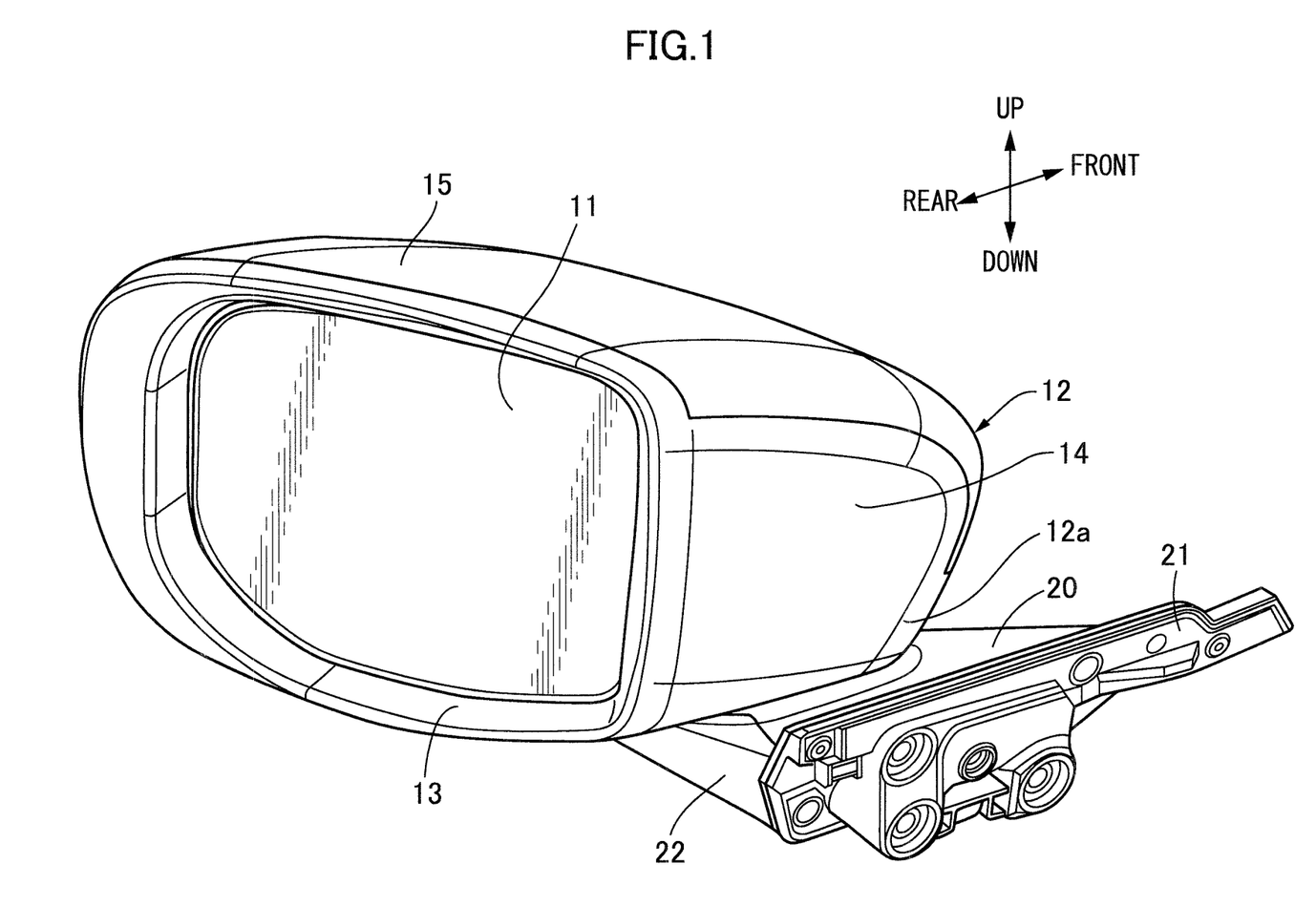
FIG. 1 is a perspective view when a vehicle door mirror is viewed obliquely from the rear.
Figure 2:
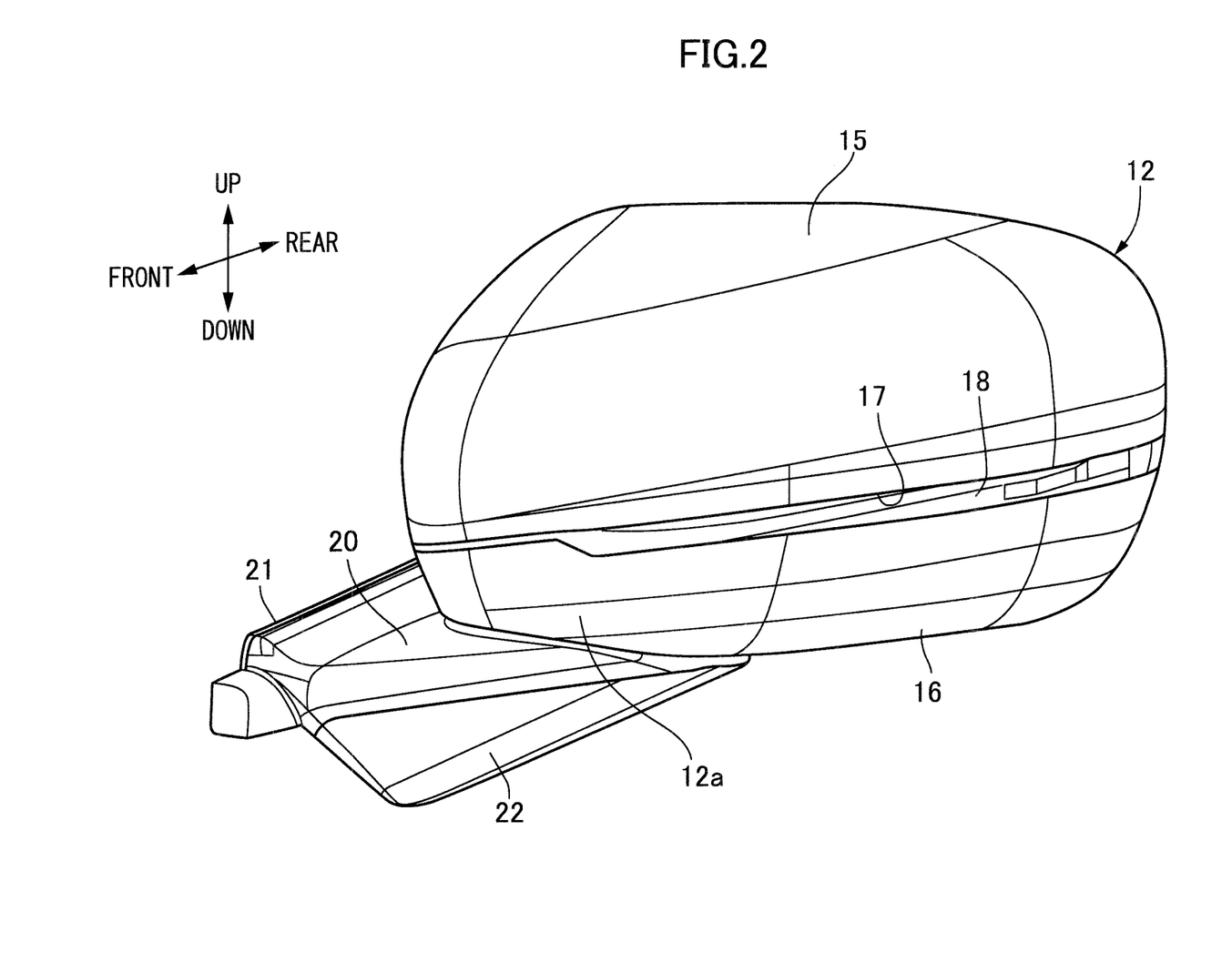
FIG. 2 is a perspective view when the vehicle door mirror is viewed obliquely from the front.

An embodiment of the present invention is explained below by reference to the attached FIG. 1 to FIG. 7; first, in FIG. 1 and FIG. 2, left and right front side doors in a passenger vehicle are provided with a mirror housing 12, into which a mirror 11 for viewing to the rear of the vehicle is fitted, so that the mirror housing 12 can pivot between a raised position in which it projects sideways from the front side door and a retracted position in which it is retracted toward the front side door.

The mirror housing 12 is formed from a housing main body 14, made of a resin, having a mirror housing recess 13 housing the mirror 11, an upper cover 15, made of a resin, covering the housing main body 14 from a direction opposite to the mirror 11, and a lower cover 16, made of a resin, covering a lower part of the housing main body 14 from below; a side turn lamp 18 is housed within the mirror housing 12, part of the side turn lamp 18 facing a slit 17 for the lamp formed between the upper cover 15 and the lower cover 16.

The mirror 11 is retained by a mirror holder, which is not illustrated, and the mirror 11 retained by the mirror holder is disposed in an opening of the housing main body 14, that is, an open end part of the mirror housing recess 13.

Figure 3:
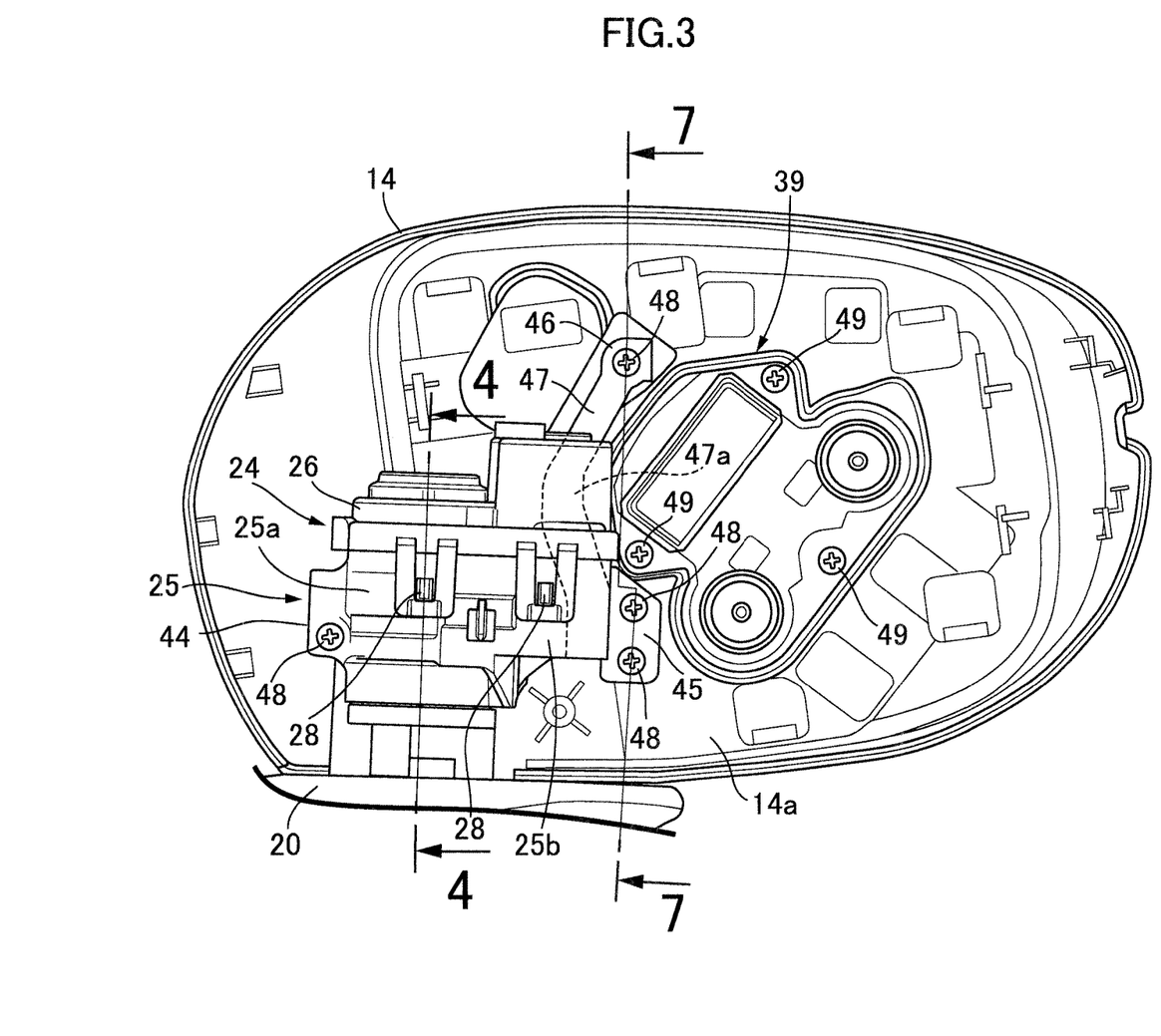
FIG. 3 is a front view, from the side opposite to the mirror, of a housing main body in a state in which an upper cover and a lower cover are omitted.
Figure 4:
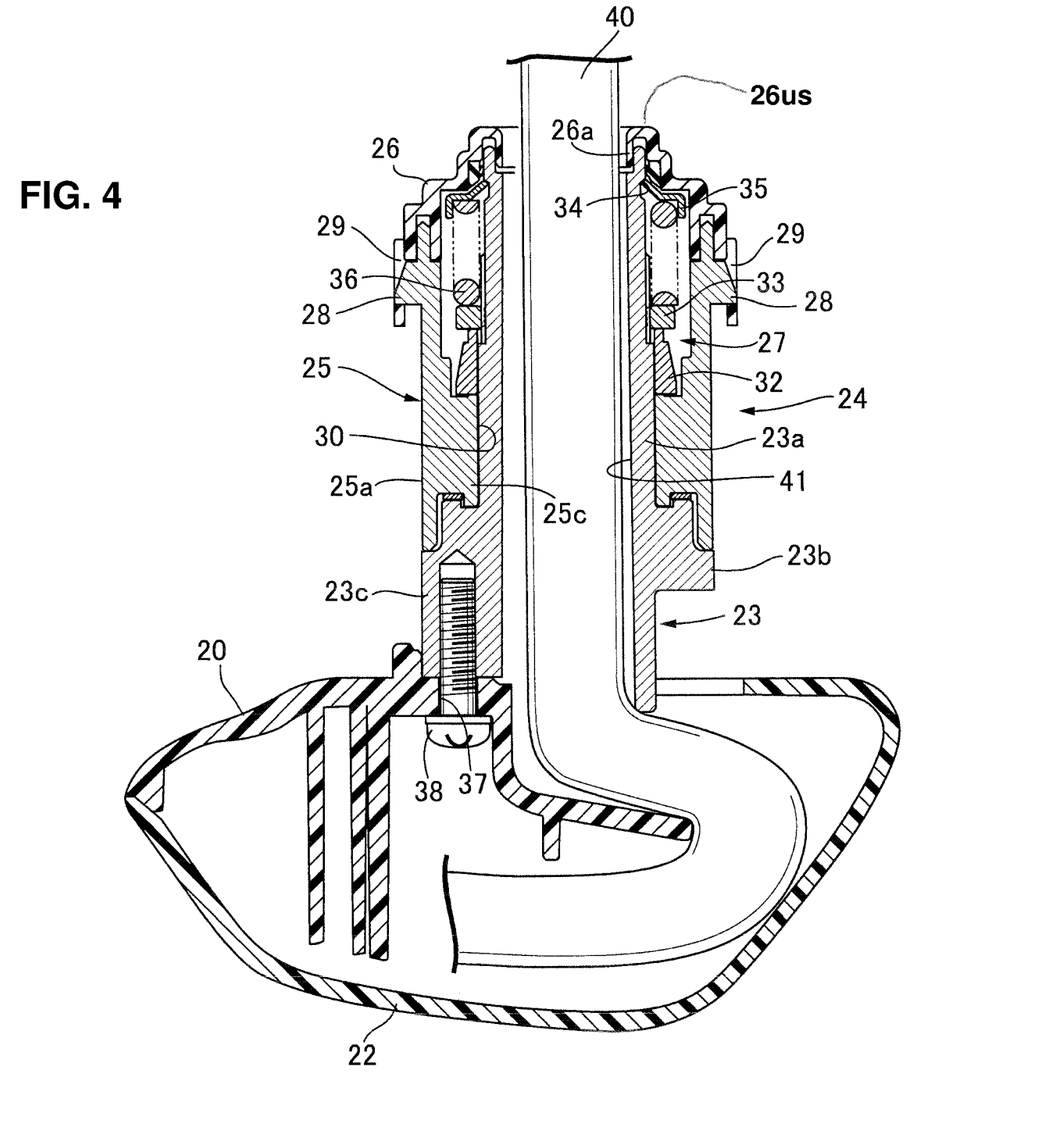
FIG. 4 is a sectional view along line 4-4 in FIG. 3.

Referring in addition to FIG. 3 and FIG. 4, a base member 20 made of a resin is mounted on the front side door so that a seat base 21 made of a resin is disposed between the base member 20 and the front side door, and the mirror housing 12 is pivotably supported on a shaft 23 standingly provided on the base member 20 at a position spaced outward from the front side door. A base cover 22, made of a resin, covering the base member 20 from below is detachably mounted on the base member 20.

An electric retraction unit 24 is housed within a base end portion 12a of the mirror housing 12, the electric retraction unit 24 is pivotably supported by the shaft 23, which is standingly provided on the base member 20 and penetrates into the interior of the base end portion 12a of the mirror housing 12, and the housing main body 14 of the mirror housing 12 is mounted on the electric retraction unit 24. That is, the base end portion 12a of the housing main body 14 is pivotably supported via the electric retraction unit 24 on the shaft 23 standingly provided on the base member 20 mounted on the front side door, and the mirror housing 12 is pivoted by operation of the electric retraction unit 24 between the raised position, in which it projects sideways from the front side door, and the retracted position, in which it is retracted toward the front side door.

The shaft 23 integrally has a cylindrical portion 23a extending in an up-down direction, a collar portion 23b that protrudes sideways from a lower part of the cylindrical portion 23a, and a cylindrical mounting boss portion 23c that projects downward from the collar portion 23b so as to be connected to the lower part of the cylindrical portion 23a and the collar portion 23b at three positions equally spaced in the peripheral direction of the cylindrical portion 23a.

Figure 5:
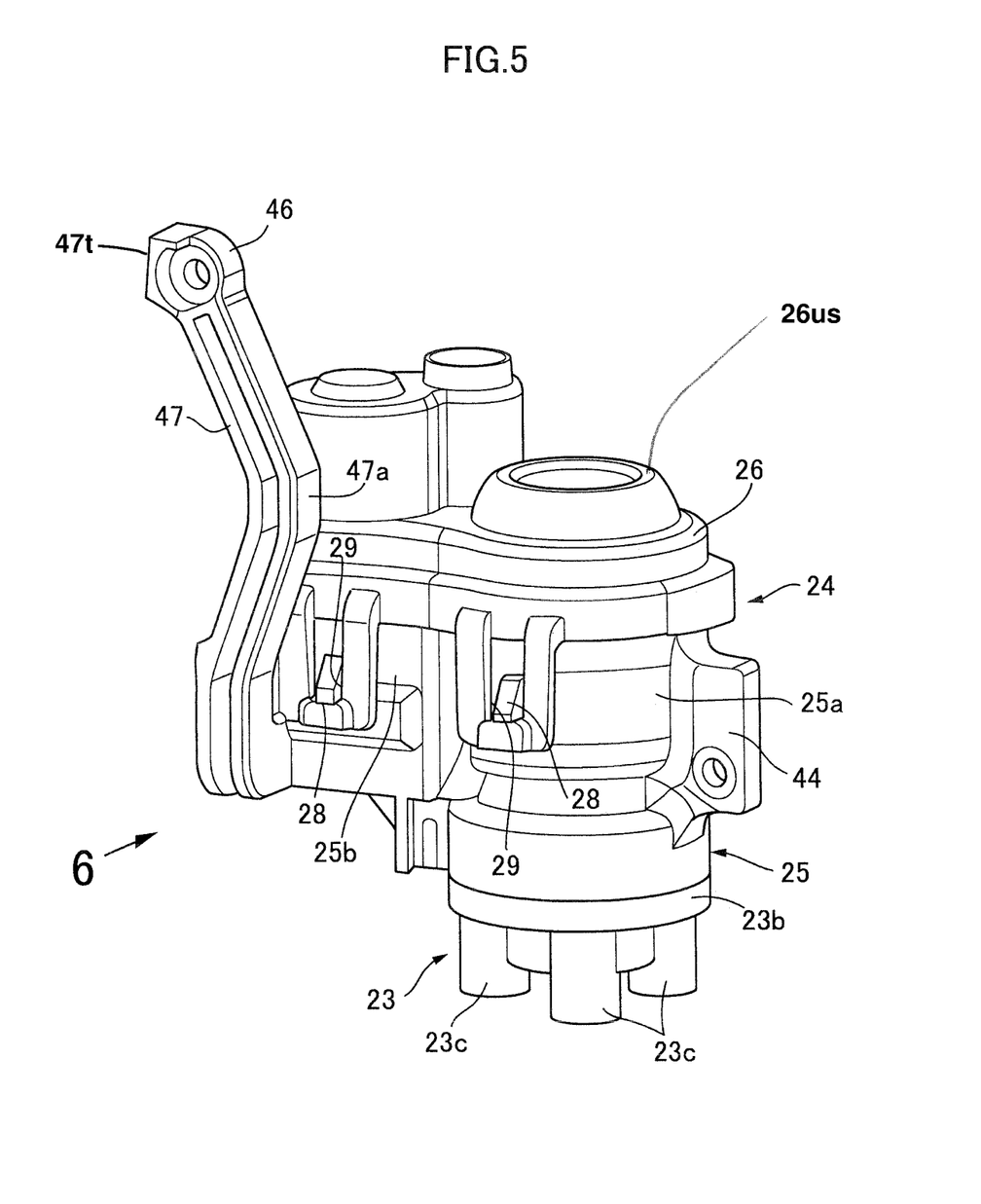
FIG. 5 is a perspective view of an electric retraction unit.
Figure 6:
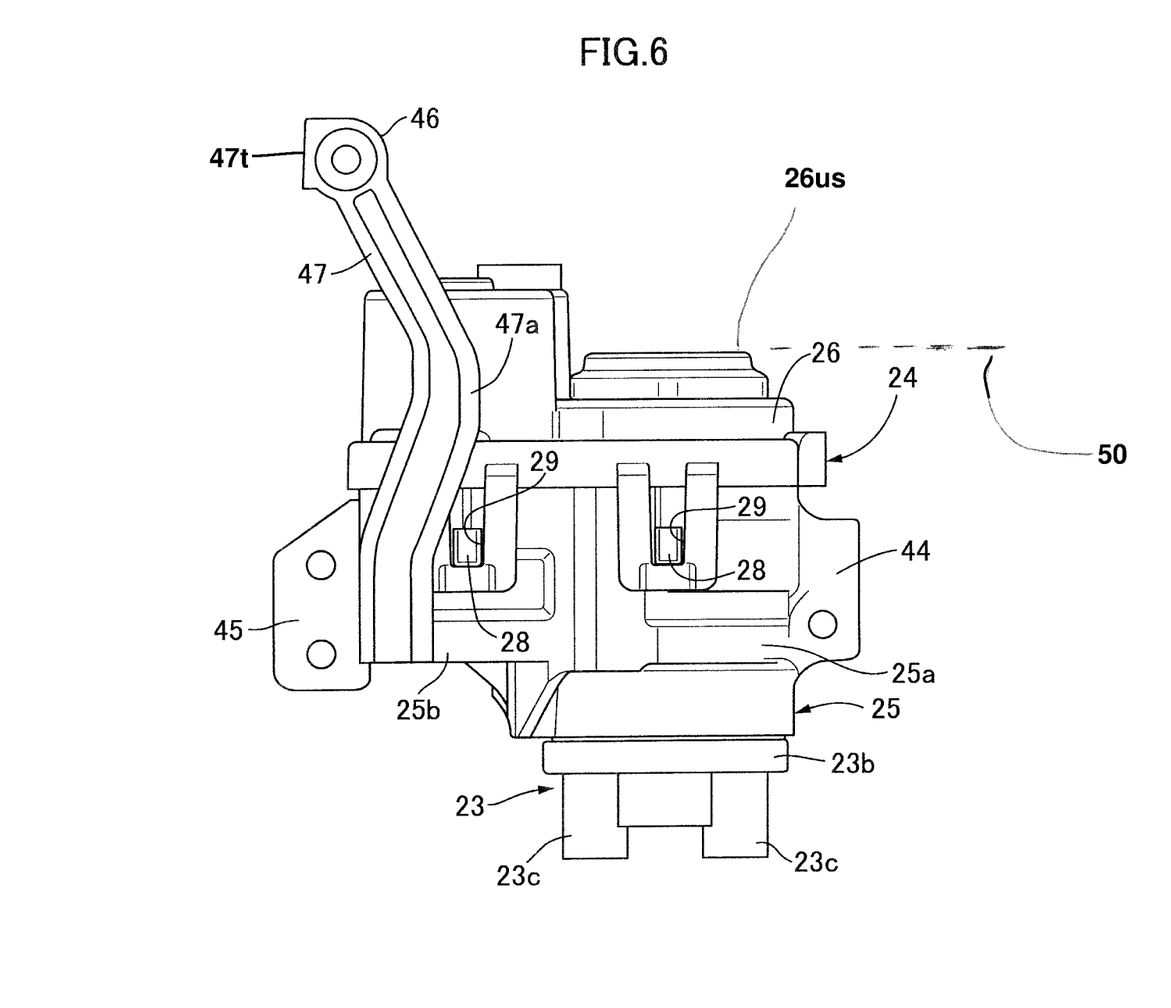
FIG. 6 is a front view from arrow 6 in FIG. 5.

Referring in addition to FIG. 5 and FIG. 6, the electric retraction unit 24 includes a gear case 25 pivotably supported on the cylindrical portion 23a of the shaft 23, a cover 26 joined to the gear case 25 so as to cover the gear case 25 from above, an electric motor (not illustrated) that exerts power for pivoting the mirror housing 12 around the axis of the cylindrical portion 23a of the shaft 23 between the retracted position and the raised position, and a drive mechanism 27 provided between the electric motor and the cylindrical portion 23a so as to pivot the mirror housing 12 around the axis of the cylindrical portion 23a in response to operation of the electric motor.

The gear case 25 is formed so as to integrally have a cylindrical portion 25a that is formed into a substantially cylindrical shape coaxially surrounding the cylindrical portion 23a of the shaft 23, and a motor housing portion 25b that protrudes sideways from the cylindrical portion 25a so as to house part of the electric motor, and the gear case 25 is fastened to the housing main body 14 of the mirror housing 12.

An engagement claw 28 protruding outward is projectingly provided at a plurality of locations in the peripheral direction of an upper part of the gear case 25. The cover 26 is formed so as to cover an upper part of the gear case 25 while covering, from above, the electric motor having part thereof housed in the motor housing portion 25b of the gear case 25. As seen in FIG. 6, a portion of the cover 26 above the shaft 23 includes an upper surface 26us which defines a level 50. The cover 26 has a cross-sectional shape that substantially corresponds to the cross-sectional shape of the gear case 25. Engaging the engagement claw 28 of the gear case 25 with a latching hole 29 provided in the cover 26 joins the cover 26 to the gear case 25.

Formed on a lower part of the cylindrical portion 25a of the gear case 25 is a first bearing portion 25c having a support hole 30 through which the cylindrical portion 23a of the shaft 23 extends, the first bearing portion 25c being pivotably supported by the cylindrical portion 23a, and the gear case 25 being thrust-supported by the collar portion 23b of the shaft 23. A cylindrical second bearing portion 26a is formed integrally with the cover 26, the second bearing portion 26a being fitted onto an upper end part of the cylindrical portion 23a of the shaft 23 so that it is pivotably supported by the upper end part of the cylindrical portion 23a.

A clutch gear 32, which is part of the drive mechanism 27, is rotatably fitted around the cylindrical portion 23a of the shaft 23 while abutting against the first bearing portion 25c, and a clutch plate 33 sandwiching the clutch gear 32 between itself and the first bearing portion 25c is non-rotatably and axially movably fitted around the cylindrical portion 23a. A coil-shaped clutch spring 36 is provided in a compressed state between the clutch plate 33 and a retainer 35 that is received by an annular latching step part 34 formed on the outer periphery of the cylindrical portion 23a of the shaft 23 at a position close to the second bearing portion 26a.

A screw member 38 inserted from below through a through hole 37 formed in the base member 20 is screwed into the mounting boss portion 23c of the shaft 23, and tightening the screw member 38 fixes the shaft 23 to the base member 20 so that the shaft 23 rises upward from the base member 20.

In a state in which no external force with a predetermined value or greater is acting on the mirror housing 12, the clutch gear 32 is sandwiched between the first bearing portion 25c and the clutch plate 33 to thus be prevented from rotating around the axis of the cylindrical portion 23a, and when in this state the electric motor 30 operates, the electric retraction unit 24, that is, the mirror housing 12, pivots around the axis of the cylindrical portion 23a between the retracted position, in which it is retracted toward the front side door, and the raised position, in which it projects sideways from the front side door.

On the other hand, when a predetermined value or greater of external force acts on the mirror housing 12, the clutch gear 32 can pivot around the axis of the cylindrical portion 23a between a rearward tilted position and a forward tilted position while slipping between the first bearing portion 25c and the clutch plate 33, thus enabling the mirror housing 12 to be manually pivoted or the mirror housing 12 to be pivoted by collision or contact with another obstacle.

The electric motor of the electric retraction unit 24, the side turn lamp 18, and an electric motor (not illustrated) of a mirror angle adjustment unit 39 (see FIG. 3) that pivots the mirror holder retaining the mirror 11 in the left-right and up-down directions are housed within the mirror housing 12 as electrical components, and a cord 40 connected to these electrical components is guided out from a cord through hole 41, formed within the cylindrical portion 23a of the shaft 23, toward the base member 20 side. Furthermore, the cord 40 extends from between the base member 20 and the base cover 22, through the seat base 21, to the interior of the front side door.

Figure 7:
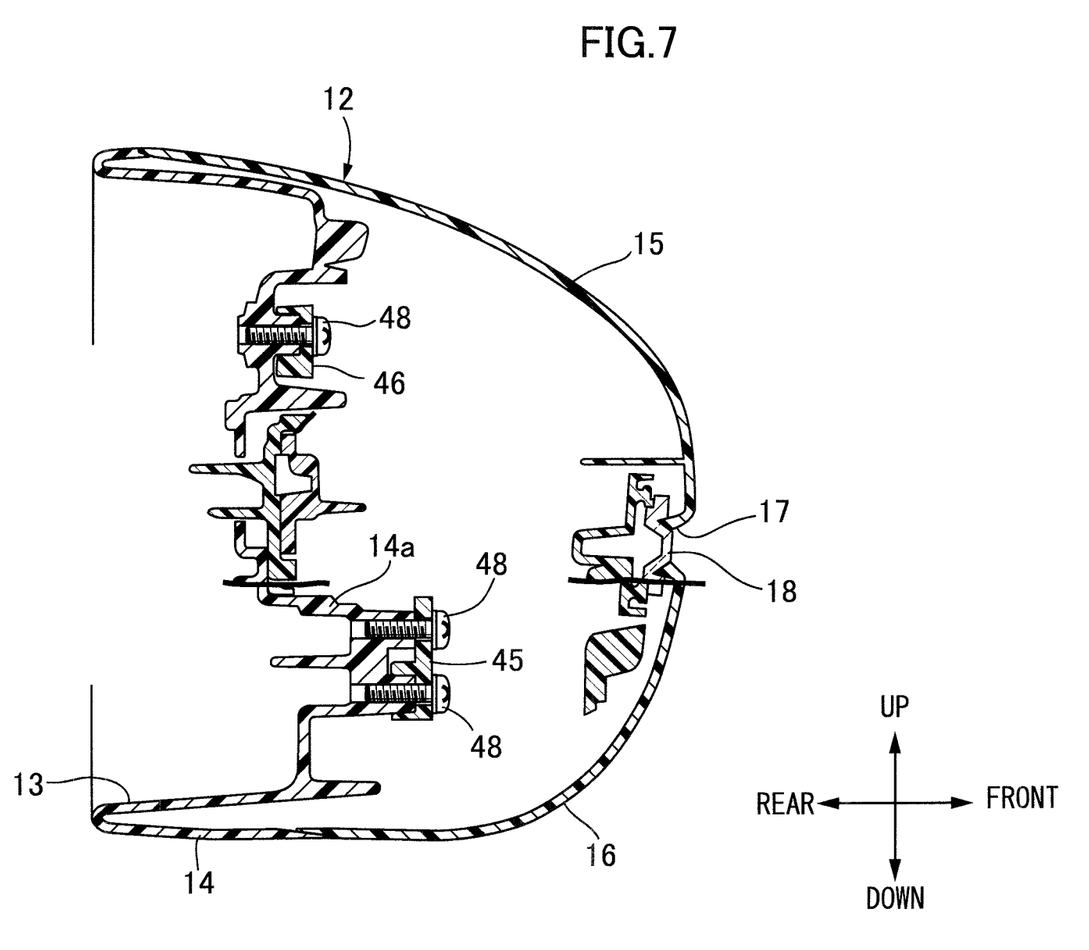
FIG. 7 is a sectional view along line 7-7 in FIG. 3.

Referring in addition to FIG. 7, the housing main body 14 of the mirror housing 12 integrally has a front wall 14a forming a front end blocking part of the mirror housing recess 13, the gear case 25, which is a unit constituent member forming part of the electric retraction unit 24, is fastened to a front face of the front wall 14a by means of a plurality of, for example four, first screw members 48, and the mirror angle adjustment unit 39 is fastened to the front face of the front wall 14a at a position adjacent to the electric retraction unit 24 from the side by means of a plurality of, for example three, second screw members 49.

At least three housing fastening parts that are fastened to the front wall 14a of the mirror housing 12 are provided integrally with the gear case 25, and in this embodiment first, second, and third housing fastening parts 44, 45, 46 are provided integrally with the gear case 25.

The first housing fastening part 44 is provided integrally with a lower part of the cylindrical portion 25a of the gear case 25, is disposed on a side of the cylindrical portion 25a that is spaced from the mirror angle adjustment unit 39, and is fastened to the front face of the front wall 14a by means of a first screw member 48.

The second housing fastening part 45 is provided integrally with a lower part of the motor housing portion 25b of the gear case 25, is disposed at a position of the motor housing portion 25b that is close to the mirror angle adjustment unit 39 from the side, and is fastened to the front face of the front wall 14a by means of a pair of upper and lower first screw members 48.

A vibration suppression arm part 47 is provided integrally with the gear case 25, the vibration suppression arm part 47 extending in a direction in which it is spaced from at least two housing fastening parts of the first to third housing fastening parts 44, 45, 46, in this embodiment the first and second housing fastening parts 44, 45.

A base part of the vibration suppression arm part 47 is integrally and connectedly provided on the gear case 25 in the vicinity of a specific housing fastening part that is one of the first and second housing fastening parts 44, 45, which are of the first, second, and third housing fastening parts 44, 45, 46 other than the third housing fastening part 46, which is formed on a tip end part 47t of the vibration suppression arm part 47. As shown in FIGS. 5 and 6, the tip end part 47t of the vibration suppression arm part 47 is disposed above the level 50 defined by the upper surface 26us of the cover 26. In this embodiment, the specific housing fastening part is the second housing fastening part 45, the vibration suppression arm part 47 is integrally and connectedly provided on the gear case 25 in the vicinity of the second housing fastening part 45 and extends upward, and the second housing fastening part 45 is fastened to the front face of the front wall 14a of the mirror housing 12 by means of the pair of upper and lower first screw members 48, in order to enhance the strength of the vicinity of a base part of the vibration suppression arm part 47, via which it is connected to the gear case 25.

The third housing fastening part 46, which is the remaining one housing fastening part of the at least three housing fastening parts 44 to 46, is formed on the tip end part of the vibration suppression arm part 47, and the third housing fastening part 46 is also fastened to the front face of the front wall 14a of the housing main body 14 by means of a first screw member 48.

The vibration suppression arm part 47 is formed so as to have a bent portion 47a in an intermediate part thereof, and this bent portion 47a is formed so as to bend to the side on which it avoids overlapping the mirror angle adjustment unit 39 when viewed from the vehicle fore-and-aft direction in a state in which the mirror housing 12 is at the raised position and protrudes sideways from the side door, and in particular to the side on which it avoids overlapping a part of the mirror angle adjustment unit 39 that is fastened to the front face of the front wall 14a, that is, the position of the second screw member 49.

The operation of this embodiment is now explained; at least three housing fastening parts fastened to the front wall 14a of the housing main body 14 of the mirror housing 12, in this embodiment the first, second, and third housing fastening parts 44, 45, 46, are provided integrally with the gear case 25 forming part of the electric retraction unit 24. The vibration suppression arm part 47, which extends in a direction going away from at least two housing fastening parts of these housing fastening parts 44, 45, 46, in this embodiment the first and second housing fastening parts 44, 45, is provided integrally with the gear case 25. Of the at least three housing fastening parts 44 to 46, the remaining one housing fastening part, that is, the third housing fastening part 46, is formed on the tip end part of the vibration suppression arm part 47.

Therefore, an operation of fastening a member, used exclusively for suppressing vibration, to the mirror housing 12 other than the electric retraction unit 24 is unnecessary, and it is possible to enhance the ease of mounting and reduce the cost while suppressing any increase in the number of components. Moreover, the vibration suppression arm part 47 extends in a direction going away from the first and second housing fastening parts 44, 45, and it is possible to attenuate the vibration transmitted from the side door side to the mirror housing 12 side via the electric retraction unit 24, and to suppress effectively small vibrations of the mirror housing 12.

Furthermore, since the vibration suppression arm part 47 is formed so as to have the bent portion 47a in the intermediate part thereof, the route of transmission of vibration from the electric retraction unit 24 to the mirror housing 12 can be made longer, and it is possible to attenuate the vibration transmitted to the mirror housing 12 side and to suppress effectively small vibrations of the mirror housing 12.

Moreover, since the bent portion 47a is formed so as to bend toward the side on which overlapping the mirror angle adjustment unit 39 is avoided when viewed in the vehicle fore-and-aft direction in a state in which the mirror housing 12 is in the raised position and protrudes sideways from the side door, in particular to the side on which it avoids a part of the mirror angle adjustment unit 39 that is fastened to the front face of the front wall 14a of the housing main body 14, it is possible to easily carry out mounting of the mirror angle adjustment unit 39 on the housing main body 14 of the mirror housing 12 and removal therefrom without interference from the vibration suppression arm part 47.

Furthermore, since the base part of the vibration suppression arm part 47 is integrally and connectedly provided on the gear case 25 in the vicinity of the second housing fastening part 45, and the second housing fastening part 45 is fastened to the front face of the front wall 14a of the mirror housing 12 by means of the pair of upper and lower first screw members 48, it is possible to enhance the strength of the vicinity of the part of the vibration suppression arm part 47 connected to the gear case 25.

An embodiment of the present invention is explained above, but the present invention is not limited to the above-mentioned embodiment and may be modified in a variety of ways as long as the modifications do not depart from the gist of the present invention.

What is claimed is:

1. A vehicle door mirror comprising
a mirror housing that has a mirror housing recess housing a mirror,
a base member that is configured to be mounted on a side door of a vehicle,
a shaft that is standingly provided on the base member so as to pivotably support a base end part of the mirror housing,
and an electric retraction unit that is disposed between the shaft and the mirror housing so as to pivot the mirror housing around an axis of the shaft, the electric retraction unit comprising:
a gear case which defines a unit constituent member and which surrounds part of the shaft, and
a cover that is removably joined to the gear case so as to cover a portion of the gear case surrounding the shaft, the cover including an upper surface disposed above the shaft and defining a first level,
at least three housing fastening parts being fastened to the mirror housing and provided integrally with the gear case,
wherein a vibration suppression arm part is provided integrally with the unit constituent member and has a base part which is integrally and connectedly provided on the gear case, the vibration suppression arm part extending in a direction that goes away from at least two of the at least three housing fastening parts, and
a remaining one housing fastening part of the at least three housing fastening parts is formed in a tip end part of the vibration suppression arm part, wherein said tip end part is disposed above said first level.

2. The vehicle door mirror according to claim 1, wherein the vibration suppression arm part is formed so as to have a bent portion in an intermediate part thereof.

3. The vehicle door mirror according to claim 2, wherein
a mirror angle adjustment unit that can make the mirror tilt is fixed within the mirror housing, and
the bent portion is formed so as to bend toward a side on which overlapping the mirror angle adjustment unit is avoided when viewed from a vehicle fore-and-aft direction in a state in which the mirror housing is present at a raised position in which the mirror housing is to protrude sideways from the side door.

4. The vehicle door mirror according to claim 1, wherein
a base part of the vibration suppression arm part is integrally and connectedly provided on the unit constituent member in a vicinity of a specific housing fastening part of the at least three housing fastening parts other than the housing fastening part that is formed in the tip end part of the vibration suppression arm part, and
the specific housing fastening part is fastened to the mirror housing by means of a pair of upper and lower screw members.

5. The vehicle door mirror according to claim 2, wherein
a base part of the vibration suppression arm part is integrally and connectedly provided on the unit constituent member in a vicinity of a specific housing fastening part of the at least three housing fastening parts other than the housing fastening part that is formed in the tip end part of the vibration suppression arm part, and
the specific housing fastening part is fastened to the mirror housing by means of a pair of upper and lower screw members.

6. The vehicle door mirror according to claim 3, wherein
a base part of the vibration suppression arm part is integrally and connectedly provided on the unit constituent member in a vicinity of a specific housing fastening part of the at least three housing fastening parts other than the housing fastening part that is formed in the tip end part of the vibration suppression arm part, and
the specific housing fastening part is fastened to the mirror housing by means of a pair of upper and lower screw members.

7. The vehicle door mirror of claim 1, wherein the gear case has a plurality of engagement claws protruding outwardly and projectingly provided on an upper part thereof, and wherein the electric retraction unit further comprises a cover that is removably joined to the gear case so as to cover the gear case from above, and wherein the cover has a plurality of latching holes formed therein which receive the engagement claws of the gear case.

8. A vehicle door mirror comprising
a mirror housing that has a mirror housing recess housing a mirror,
a base member that is configured to be mounted on a side door of a vehicle,
a shaft that is standingly provided on the base member so as to pivotably support a base end part of the mirror housing,
and
an electric retraction unit that is disposed between the shaft and the mirror housing so as to pivot the mirror housing around an axis of the shaft, the electric retraction unit comprising a gear case which forms the unit constituent member and surrounds part of the shaft,
at least three housing fastening parts being fastened to the mirror housing and provided integrally with a unit constituent member forming part of the electric retraction unit,
wherein a vibration suppression arm part is provided integrally with the unit constituent member and has a base part which is integrally and connectedly provided on the gear case, the vibration suppression arm part extending in a direction that goes away from at least two of the at least three housing fastening parts, wherein the vibration suppression arm part is formed so as to have a bent portion in an intermediate part thereof, and
wherein a remaining one housing fastening part of the at least three housing fastening parts is formed in a tip end part of the vibration suppression arm part,
wherein a mirror angle adjustment unit that can make the mirror tilt is fixed within the mirror housing, and
wherein the bent portion is formed so as to bend toward a side on which overlapping the mirror angle adjustment unit is avoided when viewed from a vehicle fore-and-aft direction in a state in which the mirror housing is present at a raised position in which the mirror housing is to protrude sideways from the side door.

9. The vehicle door mirror of claim 8, wherein the gear case has a plurality of engagement claws protruding outwardly and projectingly provided on an upper part thereof, and wherein the electric retraction unit further comprises a cover that is removably joined to the gear case so as to cover the gear case from above, and wherein the cover has a plurality of latching holes formed therein which receive the engagement claws of the gear case.

10. The vehicle door mirror of claim 8, wherein the electric retraction unit further comprises a cover that is removably joined to the gear case so as to cover the gear case from above, the cover including an upper surface disposed above the shaft, and wherein the tip end part of the vibration suppression arm part is disposed above said upper surface of the cover.

* * * * *